(12) United States Patent
Hagelthorn (10) Patent No.: US 10,975,909 B1
(45) Date of Patent: Apr. 13, 2021

(54) SYSTEM AND METHOD TO PRECISELY ADJUST TAPERED ROLLER BEARINGS USING A FOUR-PIECE JAM NUT CONFIGURATION

(71) Applicant: George A. Hagelthorn, Dearborn, MI (US)

(72) Inventor: George A. Hagelthorn, Dearborn, MI (US)

( * ) Notice: Subject to any disclaimer, the term of this patent is extended or adjusted under 35 U.S.C. 154(b) by 0 days.

(21) Appl. No.: 16/780,029

(22) Filed: Feb. 3, 2020

(51) Int. Cl.
*F16C 25/06* (2006.01)
*F16C 23/06* (2006.01)
*F16C 19/36* (2006.01)

(52) U.S. Cl.
CPC ............ *F16C 23/06* (2013.01); *F16C 19/364* (2013.01)

(58) Field of Classification Search
CPC ...... F16B 39/10; F16C 19/364; F16C 19/386; F16C 19/548; F16C 25/06; F16C 2229/00; F16C 2326/02
See application file for complete search history.

(56) References Cited

U.S. PATENT DOCUMENTS

| | | |
|---|---|---|
| 3,294,141 A | 12/1966 | Schotthoefer |
| 3,942,570 A | 3/1976 | Bochman, Jr. et al. |
| 4,431,043 A | 2/1984 | Goodell et al. |
| 4,626,111 A | 12/1986 | Swasey et al. |
| 4,971,501 A | 11/1990 | Chavez |
| 5,174,839 A | 12/1992 | Schultz et al. |
| 5,190,355 A | 3/1993 | Hobbie et al. |
| 5,366,300 A | 11/1994 | Deane et al. |
| 5,533,794 A | 7/1996 | Faison |
| 5,533,849 A | 7/1996 | Burdick |
| 5,535,517 A | 7/1996 | Rode |
| 5,538,330 A | 7/1996 | Ehrlich |
| 5,560,687 A | 10/1996 | Hagelthorn |
| 5,772,373 A | 6/1998 | Cronin, II et al. |
| 5,795,037 A | 8/1998 | Hagelthorn |
| 5,967,721 A | 10/1999 | Giachinta et al. |
| 6,000,763 A | 12/1999 | Stevens |
| 6,027,423 A | 2/2000 | Bell |
| 6,062,737 A | 5/2000 | Thienes |
| 6,089,673 A | 7/2000 | Wiacek et al. |
| 6,203,114 B1 | 3/2001 | Ehrlich |
| 6,254,196 B1 | 7/2001 | Gee |
| 6,467,853 B1 | 10/2002 | Swartzendruber et al. |
| 6,477,927 B1 | 11/2002 | Albo et al. |
| 6,557,245 B2 | 5/2003 | Beduhn et al. |
| 7,000,995 B2 | 2/2006 | Hagelthorn |
| 7,108,428 B2 | 9/2006 | Ason et al. |

(Continued)

FOREIGN PATENT DOCUMENTS

EP 0668491 A2 8/1995
JP 2000097230 A 4/2000

*Primary Examiner* — Phillip A Johnson
(74) *Attorney, Agent, or Firm* — Dinsmore & Shohl LLP (57) ABSTRACT

A system and method for adjusting wheel-end tapered roller bearing preload force on an axle spindle with a diameter, a longitudinal groove or flat, and a thread pattern to receive an adjustment nut, having an inner washer, an inner adjustment nut, an outer washer with first detent features and an outer adjustment nut with second detent features. The first and second detent features interact so as to define at least one detent position between the outer washer and the outer adjustment nut for adjusting the preload force.

20 Claims, 7 Drawing Sheets

(56) References Cited

U.S. PATENT DOCUMENTS

| | | |
|---|---|---|
| 7,346,985 B1 | 3/2008 | Strait |
| 7,389,579 B2 | 6/2008 | Rode |
| 7,547,077 B2 | 6/2009 | Melberg et al. |
| 7,927,052 B1 | 4/2011 | Varden |
| 8,011,866 B2 | 9/2011 | Harris |
| 8,403,611 B2 | 3/2013 | Friesen et al. |
| 8,540,470 B2 | 9/2013 | Dillon et al. |
| 8,745,875 B1 | 6/2014 | Hagelthom |
| 2003/0035699 A1 | 2/2003 | Harris |
| 2005/0146206 A1* | 7/2005 | Moreau ............. F16C 19/548 301/124.1 |
| 2006/0147294 A1 | 7/2006 | Rode |
| 2007/0052287 A1* | 3/2007 | White ............. B60B 27/02 301/132 |
| 2007/0211973 A1 | 9/2007 | Rode |
| 2011/0316325 A1 | 12/2011 | Martin, III et al. |
| 2012/0292137 A1 | 11/2012 | Yoshikawa et al. |
| 2013/0125369 A1 | 5/2013 | White et al. |
| 2013/0239395 A1 | 9/2013 | Schuster et al. |

* cited by examiner

FIG. 1

5.04° Measurement for 1 - 14 Pitch Threads

SYSTEM AND METHOD TO PRECISELY ADJUST TAPERED ROLLER BEARINGS USING A FOUR-PIECE JAM NUT CONFIGURATION

FIELD OF THE INVENTION

This invention relates generally to tapered roller bearings and, in particular, to a system and method for adjusting wheel-end tapered roller bearing preload force on an axle spindle.

BACKGROUND OF THE INVENTION

Endplay

For many years, tapered roller bearing adjustment consisted of mounting a hub, two tapered roller bearings, two washers, and an oil seal onto the axle spindle to be retained with a spindle nut. The assembly was adjusted by rotating the spindle nut to achieve the condition known as "desired endplay." This term describes the amount of lateral movement of the hub assembly with respect to the axle spindle resulting from a measure of looseness attributable to the established position of the spindle nut. This movement has been measured and expressed by the number of thousandths on an inch (0.001"). Typically the acceptable range of endplay has been on the order of 0.001" to 0.005".

Preload

The term "preload" was adopted by the roller bearing industry to identify the pounds of force applied against the bearings after the spindle nut had been tightened to the extent endplay was no longer discernible. Unfortunately, it was not possible to measure the amount of preload force that occurs within the wheel-end assembly unless some form of internal sensor was placed into appropriate contact with either of the tapered roller bearings. Although this has been done on an experimental basis, it is not feasible for vehicles in highway operations due to excessive cost.

Ever since the U. S. Interstate Highway System came into being in 1956, commercial freight hauling trailers evolved from an age when the 35-foot trailer was common and its capacity was limited to gross weight limitations dictated by the state regulatory agencies. By 1982 the allowable length increased to 48 feet on the interstate and intrastate highways. Today, the allowable length of the trailer is 53 feet. The total weight allowance on each axle increased and the number of axles permissible on each trailer has also increased.

Another significant factor that affects trailer performance is the speed limit that has increased from an average of 40 miles per hour in 1956 to 75 miles per hour on many interstate routes. This resulted in an increase in the hours of daily operational service that has almost doubled. Stress and strain on all axle components increased due to the heightened intensity of tractor/trailer operations.

Another possible factor that imposes an increased operational demand is the fact there has not been any significant change in the design of tapered roller bearings in recent years. The yearly number of fatal accidents due to wheel separation accidents increased significantly since 1982. This occurred because of longer exposure to the more demanding level of performance now imposed on the vehicles than ever before. This new concept for enhanced reliability of tapered roller bearing systems was initially intended for light capacity utility and boat trailer axles on highway vehicles. However, its application by the commercial freight sector of the industry may provide a potential for improved highway safety in the future. Clearly, there is a need for an improved system and method to overcome the limitations and enhance the reliability of the existing solutions.

SUMMARY OF THE INVENTION

This disclosure discloses a system for selectively adjusting wheel-end tapered roller bearing preload force on an axle spindle with a diameter, a longitudinal groove or flat, and a thread pattern to receive an adjustment nut. The system comprises an inner washer having an inner diameter corresponding to the diameter of the axle spindle, an outer diameter, an inner surface, and an outer surface, the inner washer being received onto the axle spindle; an inner adjustment nut having a thread pattern to be received onto the axle spindle against the inner washer; an outer washer having an inner diameter corresponding to the diameter of the axle spindle to be received onto the axle spindle against the inner adjustment nut, an outer diameter, an inner surface, an outer surface and an outer edge, wherein the outer washer includes a tab or D-shape to cooperate with the longitudinal groove or flat, respectively, of the axle spindle to ensure that the outer washer does not rotate following installation, the outer washer having a first detent feature on or in the outer surface; and an outer adjustment nut having a thread pattern to be received onto the axle spindle against the outer surface of the outer washer, the outer adjustment nut having an inner surface and an outer surface, the outer adjustment nut having a second detent feature in or on the inner surface, wherein the first and second detent features interact so as to define at least one detent position between the outer washer and the outer adjustment nut.

In some embodiments of the system, the first detent feature on or in the outer surface of the outer washer comprises a plurality of recesses defined in the outer surface of the outer washer; the second detent feature of the outer adjustment nut comprises at least one nub defined on the inner surface of the outer adjustment nut; and the at least one nub interacts with the plurality of recesses so as to define the at least one detent position. According to some embodiments of the system, the first detent feature on or in the outer surface of the outer washer comprises a plurality of holes through the outer washer so as to define recesses in both the inner and outer surface of the outer washer. The plurality of holes may be positioned radially around the inner diameter of the outer washer. According to other embodiments of the system, the second detent feature of the outer adjustment nut comprises at least one nub defined on the inner surface and at least one nub defined on the outer surface of the outer adjustment nut to allow use of the outer adjustment nut with either surface positioned inwardly.

In other embodiments of the system, the at least one nub defined on the inner surface and on the outer surface of the outer adjustment nut each comprises two radially opposed nubs on the respective surface. The second detent feature of the outer adjustment nut, according to some embodiments of the system, comprises at least one nub defined on the inner surface of the outer adjustment nut and the at least one nub has a side wall and an end surface, the side wall extends from the inner surface to the end surface, the end surface being spaced from the inner surface of the outer adjustment nut by a distance of 0.003 to 0.007 inches. The side wall may have a generally straight portion and a generally radiused or sloped portion where the side wall meets the end surface, the generally straight portion extends at least 0.001 inches from the inner surface of the outer adjustment nut.

In some embodiments, each of the plurality of holes has a diameter of approximately 3/16 inch and the second detent feature of the outer adjustment nut comprises at least one nub having a diameter of approximately ⅛ inch. According to other embodiments, the inner washer has a plurality of markings on the outer surface or an outer edge, each of the plurality of markings indicating the amount of rotation needed to cause a predefined lateral movement of the inner adjustment nut as a function of the diameter and thread pattern of the axle spindle. The inner adjustment nut may further comprise at least one mark for use in determining a rotation of the inner adjustment nut relative to the inner washer. The plurality of markings on the outer surface or the outer edge of the inner washer may be spaced apart at equal angular intervals. In some embodiments, the equal angular intervals are approximately 5 degrees.

In other embodiments of the system, the inner washer includes a tab or D-shape to cooperate with the longitudinal groove or flat, respectively, on the axle spindle to ensure that the inner washer does not rotate following installation. This disclosure also discloses a method of selectively adjusting wheel-end tapered roller bearing preload force on an axle spindle with a diameter, a longitudinal groove or flat, and a thread pattern to receive an adjustment nut. The method comprises the following steps of: installing the inner washer of the system discussed above on the axle spindle; installing the inner adjustment nut of the system discussed above onto the axle spindle to abut the inner washer; tightening the inner adjustment nut until it becomes positioned against the inner washer; installing the outer washer of the system discussed above onto the axle spindle over the inner adjustment nut with the inner surface of the outer washer towards the inner adjustment nut; installing the outer adjustment nut of the system discussed above onto the axle spindle over the outer washer; tightening the outer adjustment nut until it becomes positioned against the outer washer; and further tightening the outer adjustment nut against the outer washer until the first and second detent features interact to retain the outer adjustment nut.

Some embodiments of the method further comprise, after the step of further tightening the outer adjustment nut, rotating the inner adjustment nut to move it outwardly and against the outer washer. Other embodiments of the method further comprise, after the step of tightening the inner adjustment nut until it becomes positioned against the inner washer, further tightening the inner adjustment nut to seat the bearings, then rotating the inner adjustment nut outwardly so as to reduce the preload force to approximately zero, and then tightening the inner adjustment nut until it becomes positioned against the inner washer.

The step of installing the outer washer of the system discussed above onto the axle spindle may further comprise providing the outer washer having a plurality a recesses defined in the outer surface of the outer washer or a plurality of holes through the outer washer so as to define recesses in both the inner and outer surface of the outer washer. The step of installing the outer adjustment nut of the system discussed above onto the axle spindle may comprise providing the outer adjustment nut having the second detent feature comprising at least one nub defined on the inner surface and at least one nub defined on the outer surface of the outer adjustment nut to allow use of the outer adjustment nut with either surface positioned inwardly. In another embodiment of the method, the at least one nub comprises two radially opposed nubs on the inner surface/outer surface of the outer adjustment nut.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention. In the drawings.

DETAILED DESCRIPTION OF THE INVENTION

Reference will now be made in detail to the preferred embodiments of this disclosure, examples of which are illustrated in the accompanying drawings. Wherever possible, the same reference numbers will be used throughout the drawings to refer to the same or like parts. In addition, although the terms used in this disclosure are selected from generally known and used terms, some of the terms mentioned in the description of the present invention have been selected by the applicant at his or her discretion, the detailed meanings of which are described in relevant parts of the description herein. Furthermore, it is required that this disclosure is understood, not simply by the actual terms used but by the meaning of each term lying within. U.S. Pat. No. 9,970,486 to Hagelthron discloses a system and method for measuring pre-load force during tapered roller bearing wheel adjustment that has been entirely incorporated by reference in this disclosure.

This disclosure describers the system and method to accurately adjust tapered roller bearings with the result being identified in terms of thousandths of an inch for preload as well as for endplay. Two common sizes of trailer axles are currently in use in commercial freight operations, and both benefit from this invention. A third axle configuration used on trailers equipped for hauling recreational pleasure boats served as the basis for development of the commercial freight industry versions.

Figure 1:
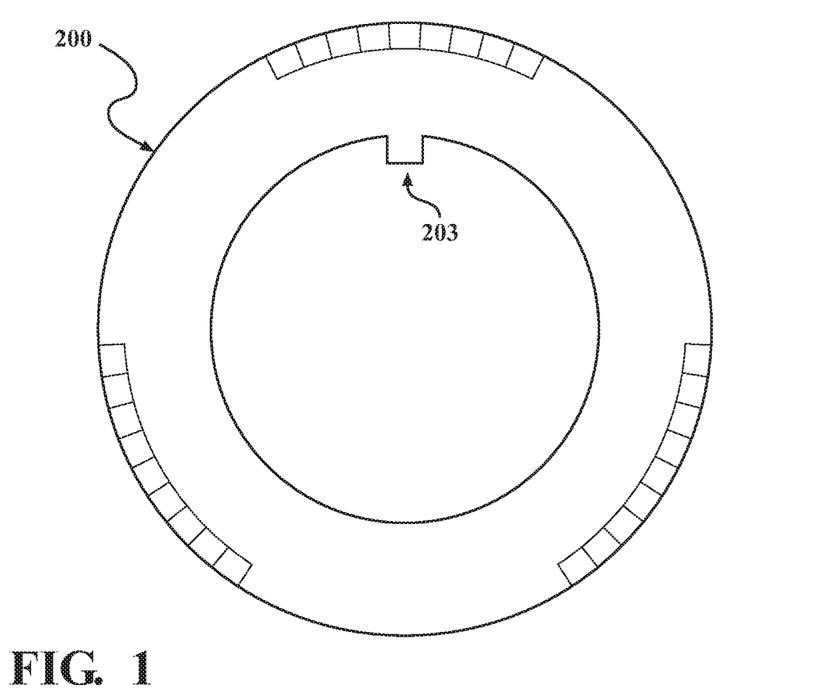
FIG. 1 is a front view of an inner washer of an embodiment of a system for adjusting wheel-end tapered roller bearing.
Figure 2:
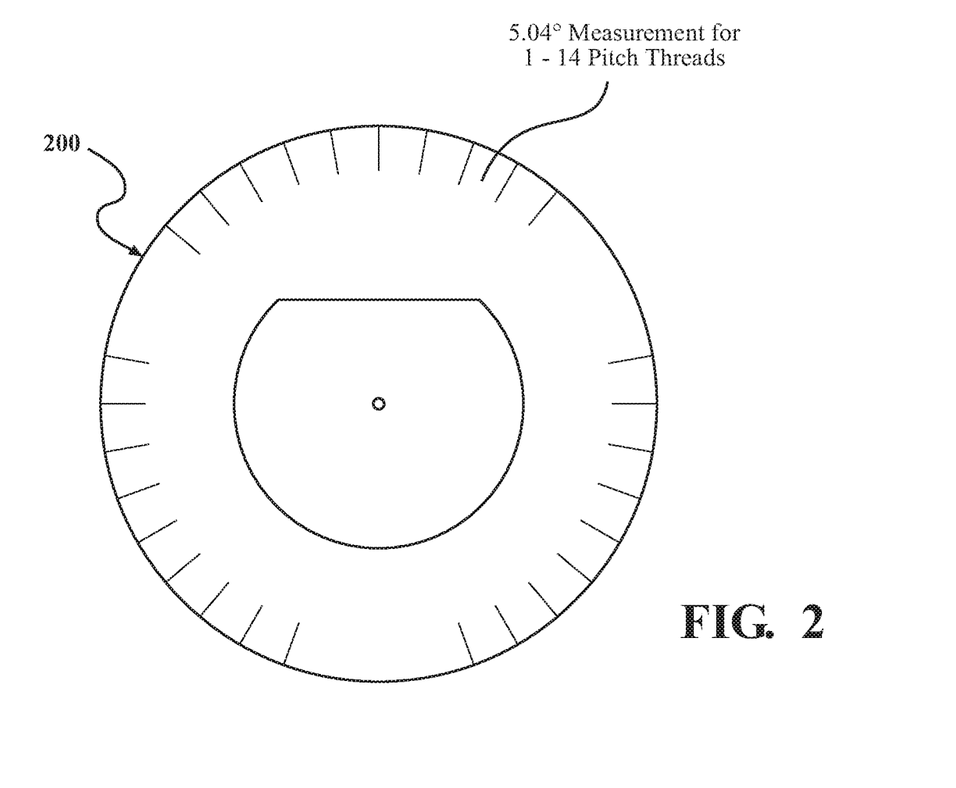
FIG. 2 is a front view of another inner washer according to an embodiment of the system.

FIG. 1 shows an inner washer 200 according to this disclosure for providing precise preload force adjustment for the wheel-end tapered roller bearing. The inner washer 200 includes a tab 203 to cooperate with a longitudinal groove (not shown) on the axle spindle to ensure that the inner washer 200 does not rotate following installation. FIG. 2 is a front view of another inner washer 200 according to this disclosure that includes a D-shape to cooperate with a longitudinal flat on the axle spindle to ensure that the inner washer 200 does not rotate following installation.

Figure 3:
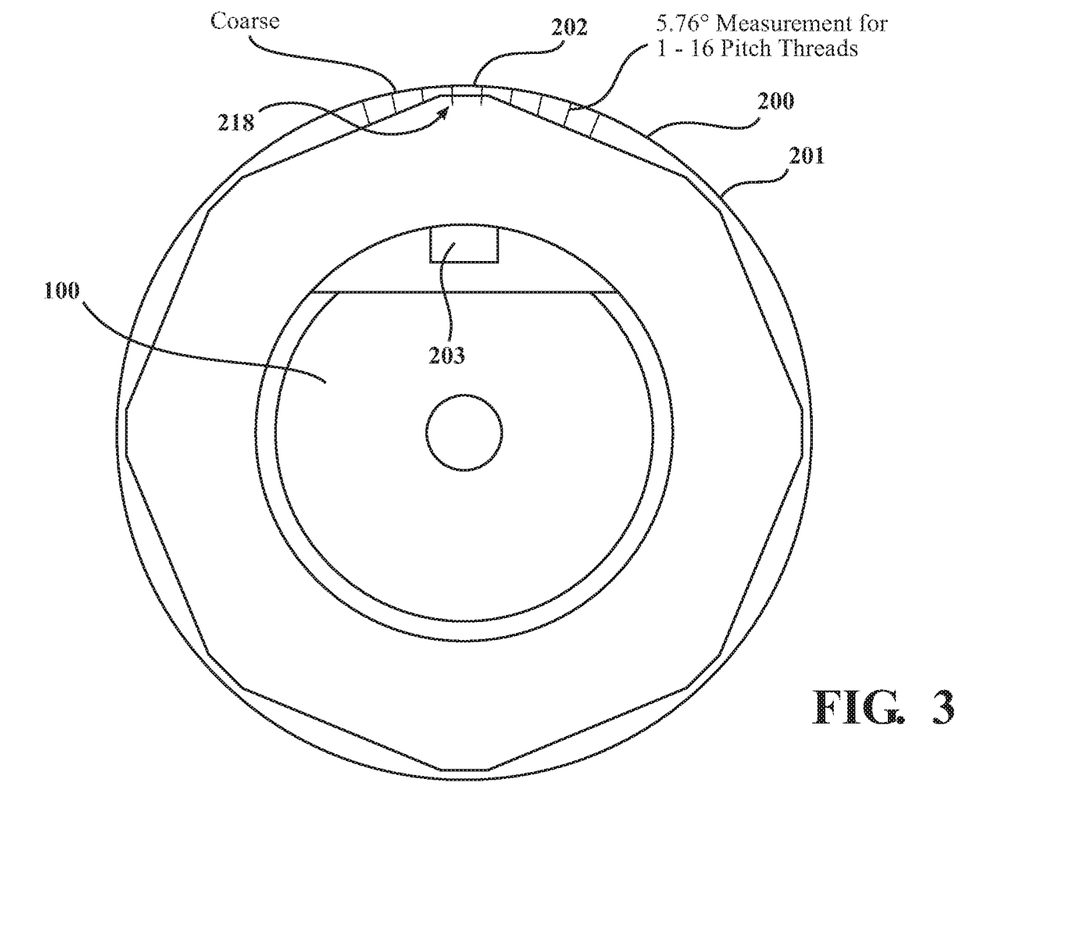
FIG. 3 shows the face of the inner washer adjacent an inner adjustment nut.
Figure 3A:
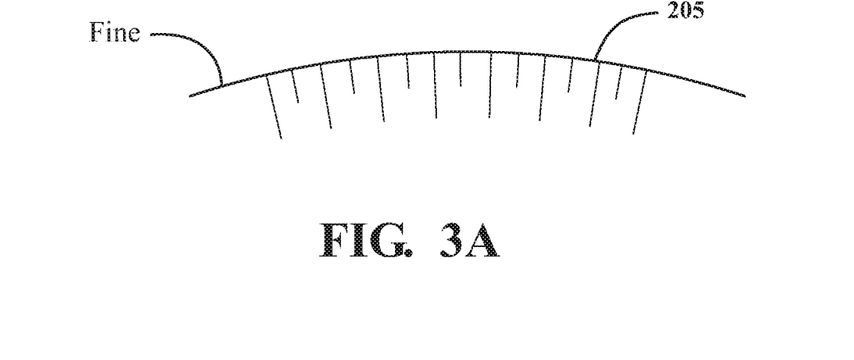
FIG. 3A provides a detailed view of a portion of the face.

FIG. 3 shows the face of the inner washer 200 adjacent to an inner adjustment nut 201 installed onto the axle spindle 100. The inner adjustment nut 201 has a thread pattern to be received onto the axle spindle 100 against the inner washer 200. The inner washer 200 is marked to show each 0.001" segment 202 for reference when rotating the adjustment nut 201. These calibrations indicate the amount of rotation needed to cause lateral movement of the inner adjustment nut 201 for each 0.001" change of axial movement along the axle spindle 100. For fine threads, closer marks 205 may be used as shown on the inset 205 view in FIG. 3. The markings 218 on the inner adjustment nut 201 with respect to the marked segments 202 are used to determine the amount of rotation needed to cause lateral movement of the inner adjustment nut 201 for each 0.001" change of axial movement.

Figure 4:
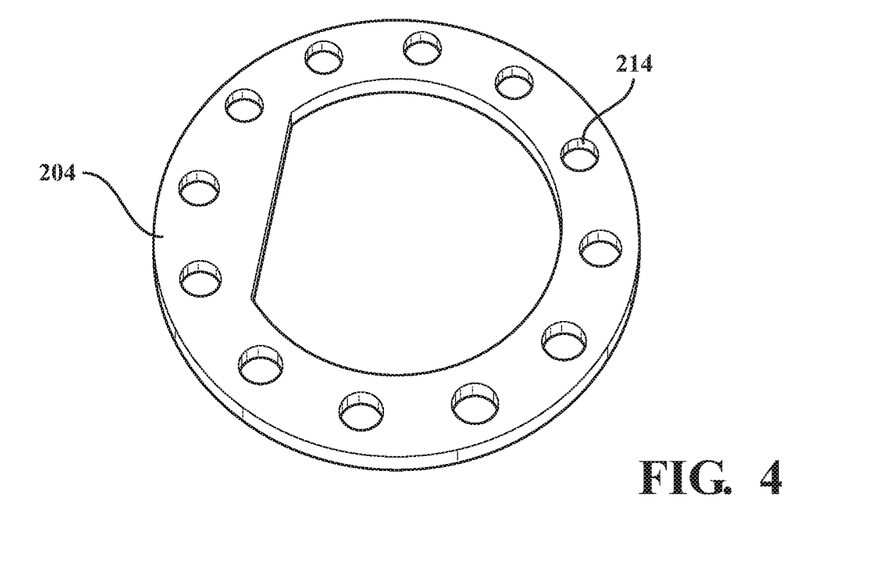
FIG. 4 is a perspective view of an outer washer according to the system.

FIG. 4 is a perspective view of an outer washer 204 according to the system. The outer washer 204 includes a D-shape to cooperate with a longitudinal groove (not shown) on the axle spindle to ensure that the inner washer 204 does not rotate following installation. In a non-limiting example, the outer washer 204 may include another shape, such as a tab, to cooperate with the longitudinal flat (not shown) on the axle spindle 100. The outer washer 204 has an inner diameter corresponding to the diameter of the axle spindle to be received onto the axle spindle against the inner adjustment nut 201. The outer washer 204 has a first detent feature(s) in the outer surface. As shown in FIG. 4, the first detent feature(s) 214 may be a plurality of holes positioned radially around the inner diameter of the outer washer 204.

Figure 5:
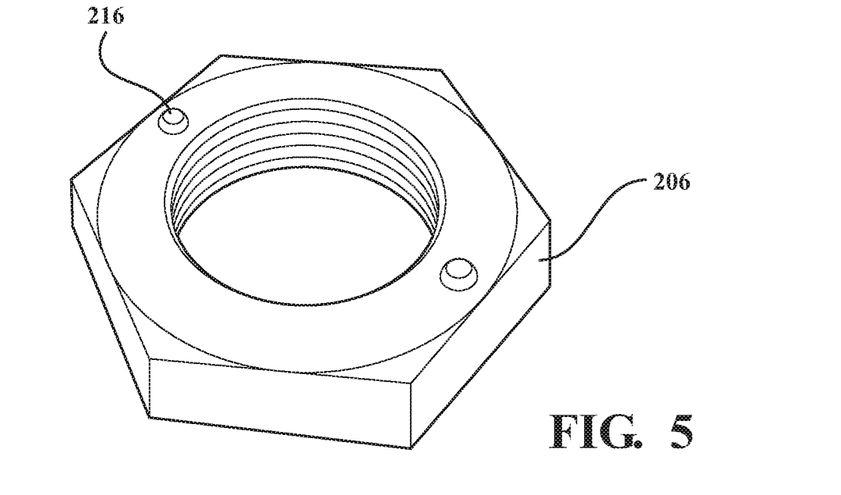
FIG. 5 is a perspective view of an outer adjustment nut according to the system.
Figure 5A:
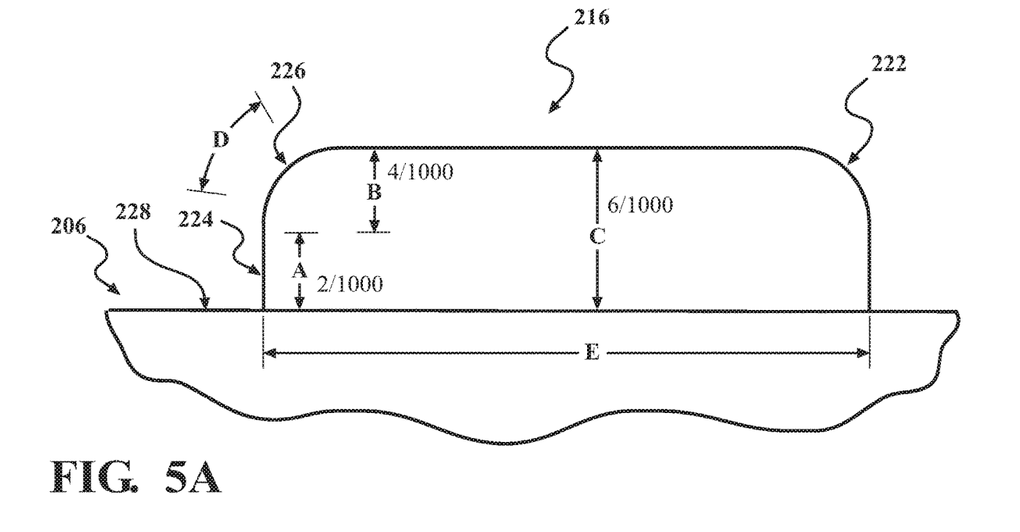
FIG. 5A is a side view of a nub shown in FIG. 5.
Figure 5B:
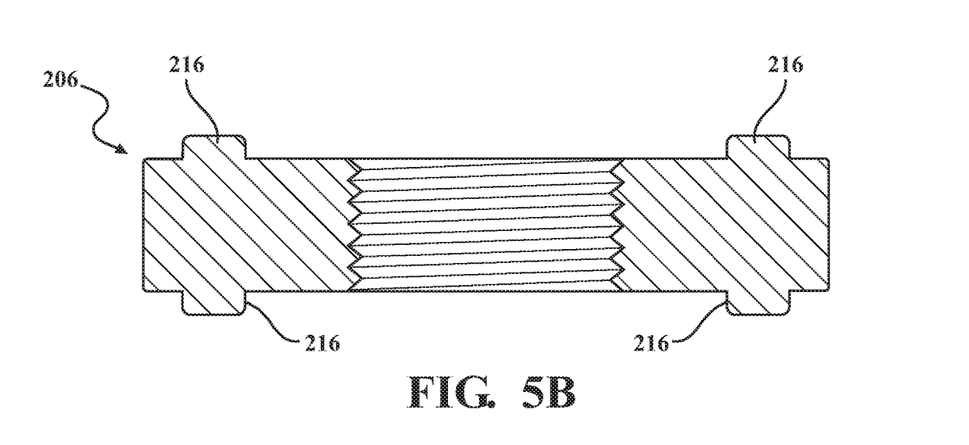
FIG. 5B is a side view of the outer adjustment nut shown in FIG. 5.

FIG. 5 is a perspective view of an outer adjustment nut 206 according to this disclosure. The outer adjustment nut 206 has a thread pattern to be received onto the axle spindle against the outer surface of the outer washer 204. The outer adjustment nut 206 has an inner surface and an opposing outer surface. The outer adjustment nut 206 has a second detent feature(s) 216 on the inner surface. As shown in FIG. 5, the second detent feature 216 is at least one nub in or on the inner surface. FIG. 5A shows a close-up side view of an embodiment of the nub 216 disposed on the inner surface of the outer adjustment nut 206. The nub 216 has a side wall and an end surface 222, the side wall extending from the inner surface 228 to the end surface 222. The end surface 222 is spaced from the inner surface 228 of the outer adjustment nut 206 by a distance of 0.003 to 0.007 inches. It should be noted that the first and second detent features interact so as to define at least one detent position, e.g. Zero endplay position, between the outer washer 204 and the outer adjustment nut 206. In some embodiments, the first detent feature is at least one nub on or in the outer surface of the outer washer 204 and the second detent feature is a plurality of recesses/holes positioned radially around the outer surface of the outer adjustment nut 206. Two nubs on or in the surface of the outer washer or outer adjustment nut is a preferred embodiment. FIG. 5B shows two nubs on both surfaces of the outer adjustment nut 206. A person skilled in the art may use other suitable shapes of the first and/or second detent features according to this disclosure. Markings on the inner washer/inner adjustment nut, as discussed above, is optional for the system or method of this disclosure.

Figure 6:
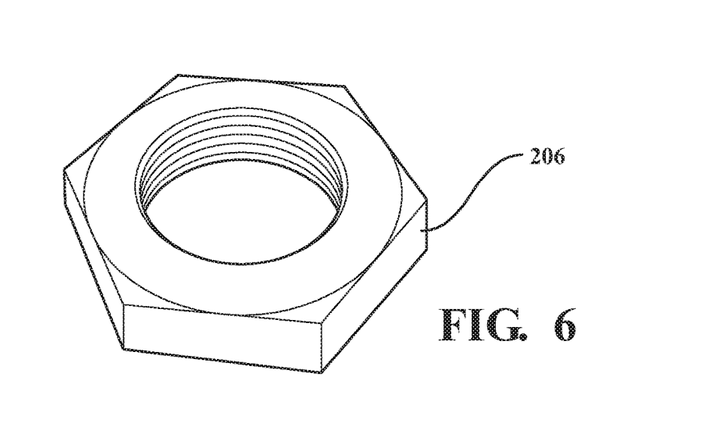
FIG. 6 is another perspective view of the outer adjustment nut shown in FIG. 5.

The side wall has a generally straight portion (A) 224 and a generally radiused or sloped portion 226 (D) where the side wall meets the end surface 222. In a non-limiting example, the generally straight portion 224 extends at least 0.001 inches from the inner surface 228 of the outer adjustment nut 206. As shown in FIG. 5A, the generally straight portion 224 (A) is about 2/1000 inches. The distance (C) between the inner surface 228 and the end surface 222 is about 6/1000 inches, and a distance (B) for the radiused or sloped portion is about 4/1000 inches. FIG. 5B is a side view of the outer adjustment nut 206 showing the second detent features 216 on both the opposing surfaces of the outer adjustment nut 206. FIG. 6 is another perspective view of the outer adjustment nut 206 shown in FIG. 5. The surface of the outer adjustment nut 206 in FIG. 6 does not have any second detent features.

FIGS. 7-12 are perspective views of the system of adjusting the wheel-end tapered roller bearing preload force according to this disclosure. First, the hub assembly has to be placed on the axle spindle 100. Then the following steps may be taken in accordance with the recommended wheel bearing adjustment procedure applicable to 1-14 UNF nuts, which are used on one-inch diameter axle spindles.

Note, the assembly of spindle configurations accommodating nuts other than the 1-14 UNF size will require different specific installation instructions from the spindle nut supplier. Although this disclosure discusses the use of 1-14 UNF nuts for selectively adjusting preload force for wheel-end tapered roller bearings, a person of skill in the art would be able to use this invention for other applications based on this disclosure.

Figure 7:
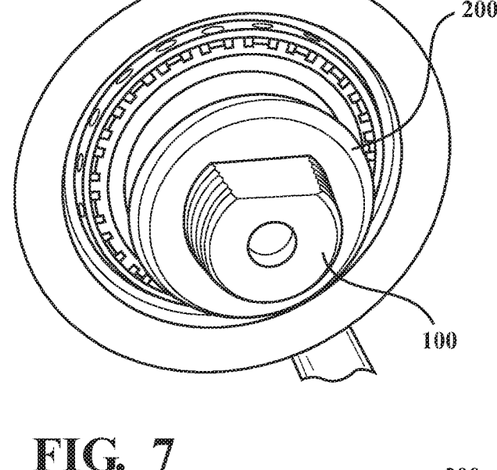
FIGS. 7-11 are perspective views of the system of adjusting the wheel-end tapered roller bearing preload force according to this disclosure.
Figure 8:
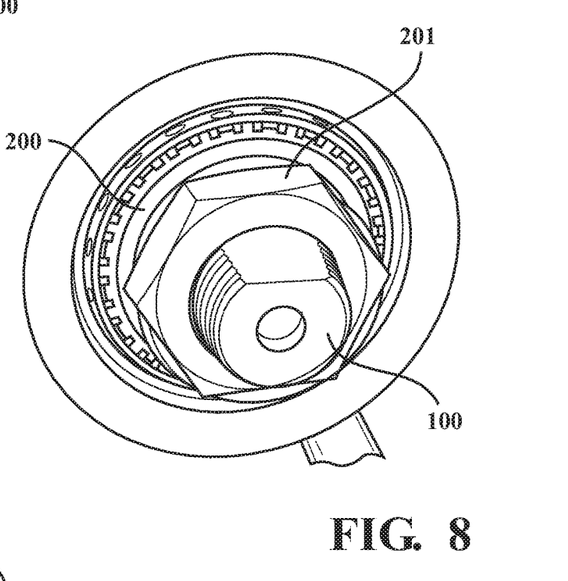

As shown in FIG. 7, after the hub assembly has been placed on the axle spindle 100, the inner washer 200 is then placed on the axle spindle 100. With the inner washer 200 in place, as shown in FIG. 8, the inner adjustment nut 201 is then threaded by hand onto the axle spindle 100 against the inner washer 200. Using a suitable tool, such as conventional wrench, the inner adjustment nut 201 is then tightened by applying enough torque (approximately 50-foot pounds) to seat the bearings and the oil seal (not shown) of the wheel-end tapered roller bearings. Using the tool, the inner adjustment nut 201 is then backed off with approximately 45 degrees of counter-clockwise rotation. This back-off rotation reduces the preload force applied in the earlier step to less than zero. In a non-limiting example, it is possible to reposition the inner adjustment nut 201 with finger tightening force to achieve a Zero endplay condition.

In this example, when the inner adjustment nut 201 is finger tightened against the inner washer 200, the Zero position of endplay is established. For additional incremental axial endplay, the inner adjustment nut 201 can be loosened with respect to the markings on the inner washer 200 (if applicable). For additional preload, the inner adjustment nut can be tightened with respect to the markings on the inner washer 200 (if applicable). In some embodiments, the inner washer 200 and the inner adjustment nut 201 may not have any markings for adjustment.

Axial movement of 0.001" of the inner adjustment nut 201 on 1" diameter of the axle spindle 100 having 14 threads per inch correlates with each 5° segment of the inner adjustment nut 201 rotation. The surface of the inner washer 200 in FIG. 2 adjacent to the inner adjustment nut 201 is marked to show all 0.001" segments for reference when rotating the adjustment nut 201. The marked segments (if applicable) are used for determining the number of segments needed to reposition the inner adjustment nut 201 from the initial position of adjustment.

Figure 9:
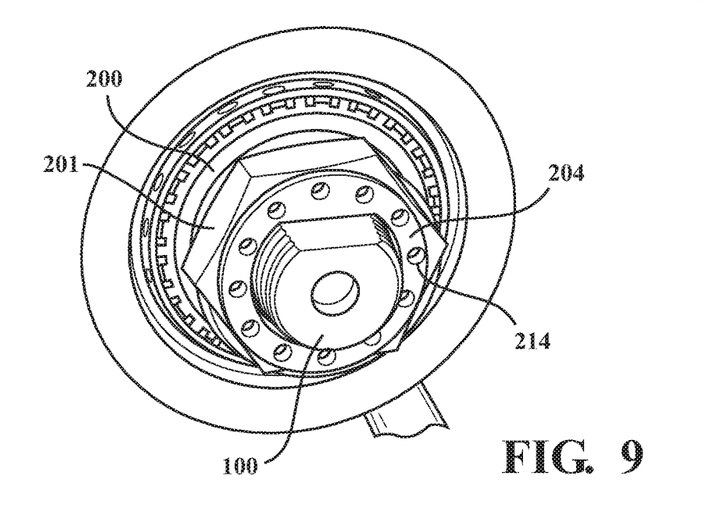

In a non-limiting example, a user may compare an apex point on the inner adjustment nut 201 periphery with respect to the markings on the inner washer 200 to select the number of segments needed for any additional nut rotation. Next, as shown in FIG. 9, the outer washer 204 is installed against the inner adjustment nut 201 with the holes 214 of either surface positioned to accept the second detent feature(s) (e.g. nubs) of the outer adjustment nut 206 as it is rotated.

Figures 10, 11:
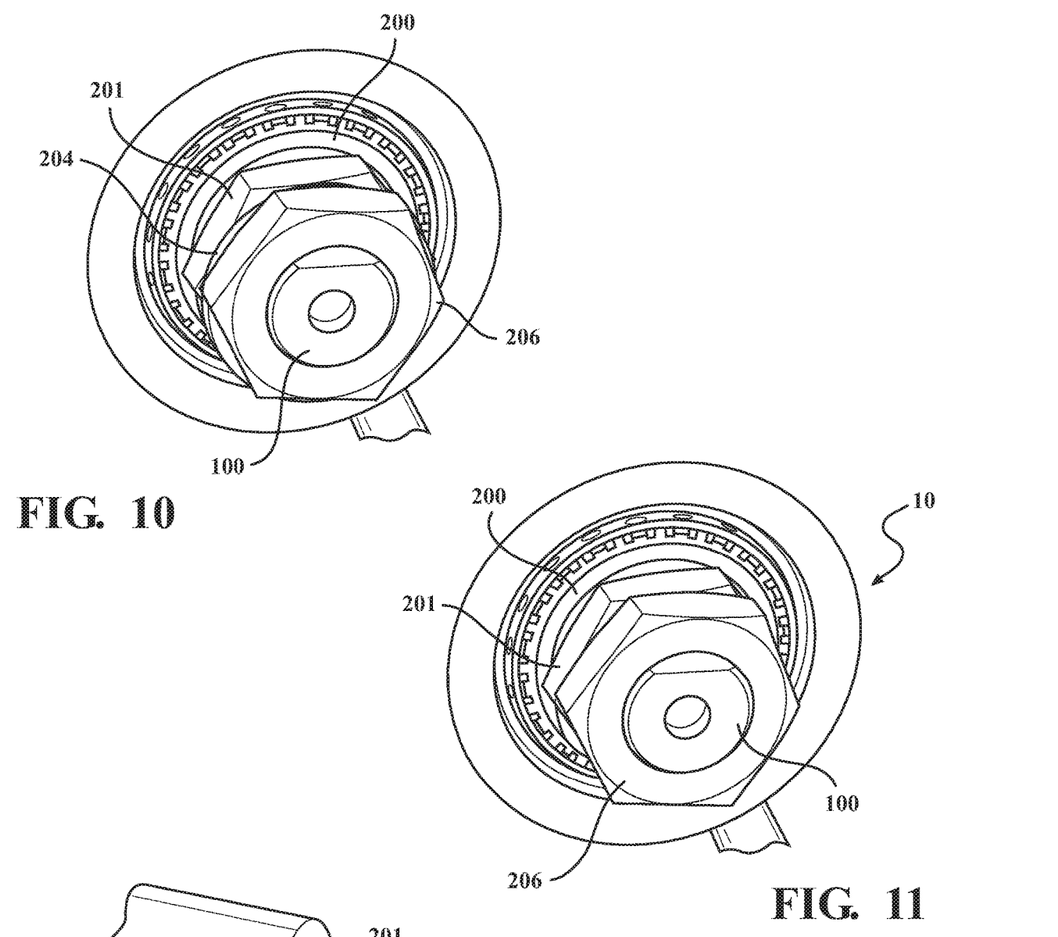

Using the tool, the outer adjustment nut 206 is tightened with enough torque to reach an interlocked condition at the desirable Zero endplay position against the outer washer 204. FIG. 10 shows the outer adjustment nut 206 installed against the outer washer 204. If necessary, additional torque may then be applied to disengage the second detent features 216 (as shown in FIGS. 5, 5A and 5B) on the surface of the outer adjustment nut 206 from the first detent features 214 (as shown in FIG. 4) of the outer washer 204. The additional torque moves the outer washer 204 axially inward against the outer adjustment nut 206. This momentary axially inward movement of the outer adjustment nut 206 is intended to allow disengagement of the nubs 216 from the holes 214, thus, allowing the outer adjustment nut 206 to rotate further toward the outer washer 204 until the next set of detent features engage.

Firm engagement of the second detent features 216, e.g. nubs, of the outer adjustment nut 206 into the first detent features 214, e.g. holes, of the outer washer 204 produces a sustainable interlocked condition. This preliminary interlocked connection between the outer adjustment nut 206 and the outer washer 204 can be secured by rotating the inner adjustment nut 201 counterclockwise on the axle spindle 100 to cause a jam-locked condition of the inner adjustment nut 201, the outer washer 204 and the outer adjustment nut 206.

In order to achieve the final jam-locked condition of the system, the inner adjustment nut 201 must be rotated counterclockwise with the tool to force it outward against the outer washer 204. It is advantageous for the inner adjustment nut 201 to be rotated counterclockwise for securing the final jam-locked condition. The recommended amount of back-off for jamming the inner adjustment nut 201 outward against the outer adjustment nut 206 is about 50 foot-pounds. The forgoing steps complete the adjustment of preload force on the wheel-end tapered roller bearings that are installed on the axle spindle 100, and thus, making the system resistant to any change.

Figure 12:
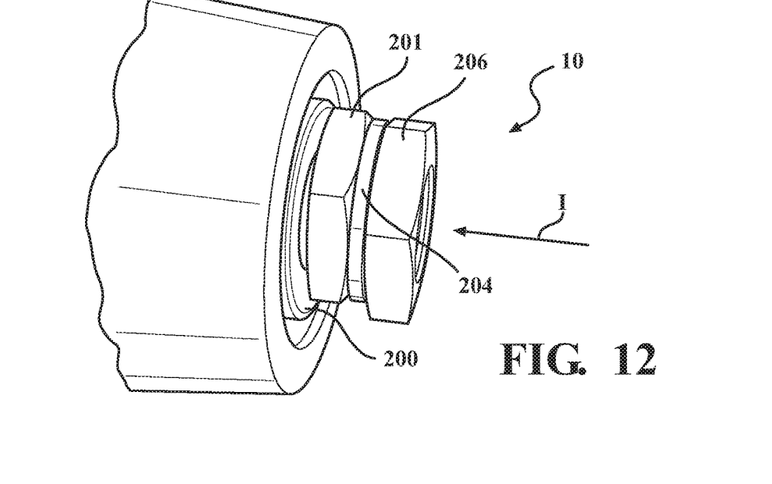
FIG. 12 is a side view of the system shown in FIG. 11.

It should be noted that the outer adjustment nut 206 resists movement until after the inner adjustment nut 201 is repositioned with 45 degrees of clockwise rotation to release the jammed system, thus, preventing disassembly of the system during normal operation/use. FIG. 11 shows a perspective view of the system in the final jam-locked condition. FIG. 12 shows a side view of the system shown in FIG. 11. Direction "I" shown in FIG. 12 is the inward direction as used in this disclosure. The direction (not shown) opposing the direction I is the outward direction as used in this disclosure. If the system needs to be disassembled, it is necessary to retighten the inner adjustment nut 201 to allow disengagement of the interlocked outer washer 204 and the outer adjustment nut 206. In other words, the inner adjustment nut 201 needs to be moved inwards away from the outer washer 204. Approximately 45 degrees of clockwise rotation of the inner adjustment nut 201 is intended to release the interlocked components before conventional procedures can be employed to remove the system from the axle spindle 100.

Figure 13:
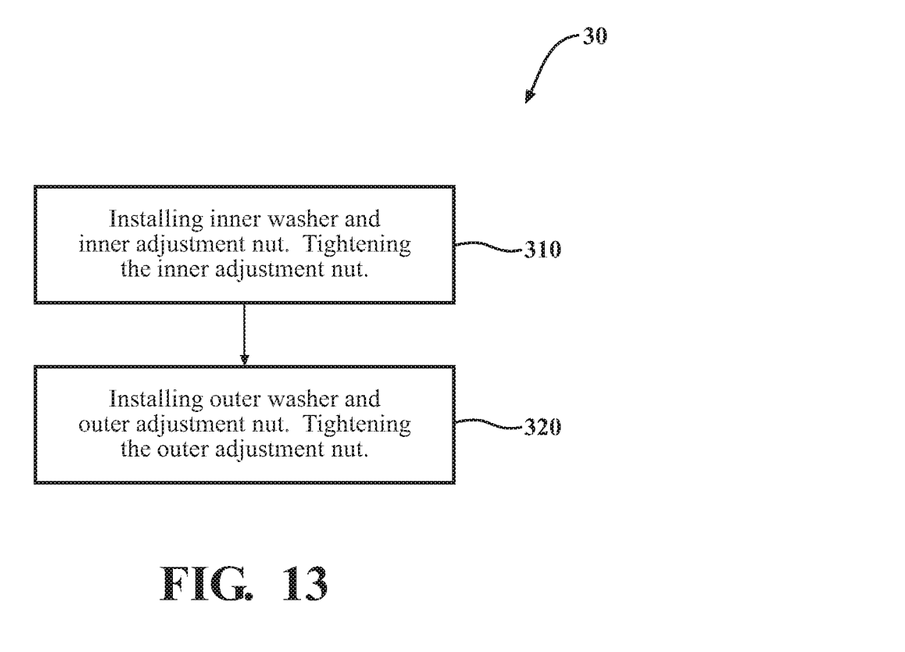
FIG. 13 shows a method of selectively adjusting wheel-end tapered roller bearing preload force on an axle spindle.

As noted above, this disclosure also discloses a method for selectively adjusting wheel-end tapered roller bearings. FIG. 13 shows a method 30 of selectively adjusting wheel-end tapered roller bearing preload force on an axle spindle. Various components of the system, such as axle spindle 100, inner washer 200, inner adjustment nut 201, outer washer 204 and outer adjustment nut 206, have been discussed above. According to the method 30, at 310, the inner washer 200 is installed on the axle spindle 100 and the inner adjustment nut 201 is tightened against the inner washer 200 to establish the Zero position of endplay. The tightening results in the inner washer 200 abutting the inner adjustment nut 201.

At 320, the outer washer 204 is installed onto the axle spindle 100 over the inner adjustment nut 201 with the inner surface of the outer washer 204 towards the inner adjustment nut 201. The outer adjustment nut 201 is then installed onto the axle spindle 100 over the outer washer 204. The outer adjustment nut 201 is then tightened until it becomes positioned against the outer washer 204. The outer adjustment nut 201 is further tightened against the outer washer 204 until the first and second detent features interact to retain the outer adjustment nut 201.

In some embodiments of the method 30, at 320, after the step of further tightening the outer adjustment nut 206, the inner adjustment nut 201 is counter-rotated to move it outwardly and against the outer washer 204. In other embodiments of method 30, at 310, after the step of tightening the inner adjustment nut 201 until it becomes positioned against the inner washer 200, the inner adjustment nut 201 is further tightened to seat the bearings, and then the inner adjustment nut 201 is rotated outwardly so as to reduce the preload force to approximately zero, and then the inner adjustment nut 201 is tightened until it becomes positioned against the inner washer 200.

In other embodiments of the method 30, at 320, the step of installing the outer washer 204 onto the axle spindle 100 comprises providing the outer washer 204 having a plurality a recesses 214 defined in the outer surface of the outer washer or a plurality of holes through the outer washer 204 so as to define recesses 214 in both the inner and outer surface of the outer washer 204. In some embodiments of the method 30, at 320, the step of installing the outer adjustment nut 206 onto the axle spindle 100 comprises providing the outer adjustment nut 206 having the second detent feature 216 comprising at least one nub defined on the inner surface and at least one nub defined on the outer surface of the outer adjustment nut 206 to allow use of the outer adjustment nut 206 with either surface positioned inwardly.

In some embodiments of the system or method according to this disclosure, an outer adjustment nut 206 may be used where the inner and/or outer surfaces of the outer adjustment nut are non-symmetrical with respect to the threads of the axle spindle 100. This means that the outer adjustment nut 206 would be in a different rotational position depending on whether it is tightened with one surface inwardly or the opposite surface inwardly.

The present disclosure has been described with reference to some embodiments. However, it is realized that variants and equivalents to the preferred embodiments may be provided without departing from the scope of the invention as defined in the accompanying claims. It is to be understood that both the foregoing general description and the following detailed description of the present invention are exemplary and explanatory and are intended to provide further explanation of the invention as claimed. It is not intended to be exhaustive or to limit embodiments to the precise form disclosed. As such, this disclosure should be interpreted broadly. It is intended that the scope be defined by the claims appended hereto.

The invention claimed is:

1. A system for adjusting wheel-end tapered roller bearing preload force on an axle spindle with a diameter, a longitudinal groove or flat, and a thread pattern to receive an adjustment nut, comprising:

an inner washer having an inner diameter corresponding to the diameter of the axle spindle, an outer diameter, an inner surface, and an outer surface, the inner washer being received onto the axle spindle;

an inner adjustment nut having a thread pattern to be received onto the axle spindle against the inner washer;

an outer washer having an inner diameter corresponding to the diameter of the axle spindle to be received onto the axle spindle against the inner adjustment nut, an outer diameter, an inner surface, an outer surface and an outer edge, wherein the outer washer includes a tab or D-shape to cooperate with the longitudinal groove or flat, respectively, of the axle spindle to ensure that the outer washer does not rotate following installation, the outer washer having a first detent feature on or in the outer surface; and an outer adjustment nut having a thread pattern to be received onto the axle spindle against the outer surface of the outer washer, the outer adjustment nut having an inner surface and an outer surface, the outer adjustment nut having a second detent feature in or on the inner surface;

wherein the first and second detent features interact so as to define at least one detent position between the outer washer and the outer adjustment nut.

2. The system according to claim 1, wherein:

the first detent feature on or in the outer surface of the outer washer comprises a plurality of recesses defined in the outer surface of the outer washer;

the second detent feature of the outer adjustment nut comprises at least one nub defined on the inner surface of the outer adjustment nut; and the at least one nub interacting with the plurality of recesses so as to define the at least one detent position.

3. The system according to claim 1, wherein the first detent feature on or in the outer surface of the outer washer comprises a plurality of holes through the outer washer so as to define recesses in both the inner and outer surface of the outer washer.

4. The system according to claim 3, wherein the plurality of holes are positioned radially around the inner diameter of the outer washer.

5. The system according to claim 3, wherein each of the plurality of holes has a diameter of approximately 3/16 inch and the second detent feature of the outer adjustment nut comprises at least one nub having a diameter of approximately 1/8 inch.

6. The system according to claim 1, wherein the second detent feature of the outer adjustment nut comprises at least one nub defined on the inner surface and at least one nub defined on the outer surface of the outer adjustment nut to allow use of the outer adjustment nut with the inner surface of the outer surface positioned inwardly.

7. The system according to claim 6, wherein the at least one nub defined on the inner surface and on the outer surface of the outer adjustment nut each comprises two radially opposed nubs on the respective surface.

8. The system according to claim 1, wherein the second detent feature of the outer adjustment nut comprises at least one nub defined on the inner surface of the outer adjustment nut and the at least one nub has a side wall and an end surface, the side wall extending from the inner surface to the end surface, the end surface being spaced from the inner surface of the outer adjustment nut by a distance of 0.003 to 0.007 inches.

9. The system according to claim 8, wherein the side wall has a generally straight portion and a generally radiused or sloped portion where the side wall meets the end surface, the generally straight portion extending at least 0.001 inches from the inner surface of the outer adjustment nut.

10. The system according to claim 1, wherein the inner washer has a plurality of markings on the outer surface or an outer edge, each of the plurality of markings indicating the amount of rotation needed to cause a predefined lateral movement of the inner adjustment nut as a function of the diameter and thread pattern of the axle spindle.

11. The system according to claim 10, wherein the inner adjustment nut further comprises at least one mark for use in determining a rotation of the inner adjustment nut relative to the inner washer.

12. The system according to claim 10, wherein the plurality of markings on the outer surface or the outer edge of the inner washer are spaced apart at equal angular intervals.

13. The system according to claim 12, wherein the equal angular intervals are approximately 5 degrees.

14. The system according to claim 1, wherein the inner washer includes a tab or D-shape to cooperate with the longitudinal groove or flat, respectively, on the axle spindle to ensure that the inner washer does not rotate following installation.

15. A method of adjusting wheel-end tapered roller bearing preload force on an axle spindle with a diameter, a longitudinal groove or flat, and a thread pattern to receive an adjustment nut, the method comprising the steps of:

installing the inner washer of claim 1 on the axle spindle;

installing the inner adjustment nut of claim 1 onto the axle spindle to abut the inner washer;

tightening the inner adjustment nut until the inner adjustment nut becomes positioned against the inner washer;

installing the outer washer of claim 1 onto the axle spindle over the inner adjustment nut with the inner surface of the outer washer towards the inner adjustment nut;

installing the outer adjustment nut of claim 1 onto the axle spindle over the outer washer;

tightening the outer adjustment nut until the outer adjustment nut becomes positioned against the outer washer; and further tightening the outer adjustment nut against the outer washer until the first and second detent features interact to retain the outer adjustment nut.

16. The method according to claim 15, further comprising, after the step of further tightening the outer adjustment nut, rotating the inner adjustment nut to move the inner adjustment nut outwardly and against the outer washer.

17. The method according to claim 15, further comprising, after the step of tightening the inner adjustment nut until the inner adjustment nut becomes positioned against the inner washer, further tightening the inner adjustment nut to seat bearings, then rotating the inner adjustment nut outwardly so as to reduce the preload force to approximately zero, and then tightening the inner adjustment nut until it becomes positioned against the inner washer.

18. The method according to claim 15, wherein the step of installing the outer washer onto the axle spindle comprises providing the outer washer having the first detent feature with a plurality of recesses defined in the outer surface of the outer washer or and/or a plurality of holes through the outer washer so as to define recesses in both the inner and outer surface of the outer washer.

19. The method according to claim 15, wherein the step of installing the outer adjustment nut onto the axle spindle comprises providing the outer adjustment nut having the second detent feature with at least one nub defined on the inner surface and at least one nub defined on the outer surface of the outer adjustment nut to allow use of the outer adjustment nut with the inner surface of the outer surface positioned inwardly.

20. The method according to claim 19, wherein the at least one nub comprises two radially opposed nubs on the inner surface and the outer surface of the outer adjustment nut.

* * * * *